June 21, 1966 R. J. O'NEILL ET AL 3,257,467
CONTINUOUS METHODS FOR EFFECTING RING SUBSTITUTION OF PHENOLS
Filed July 21, 1960
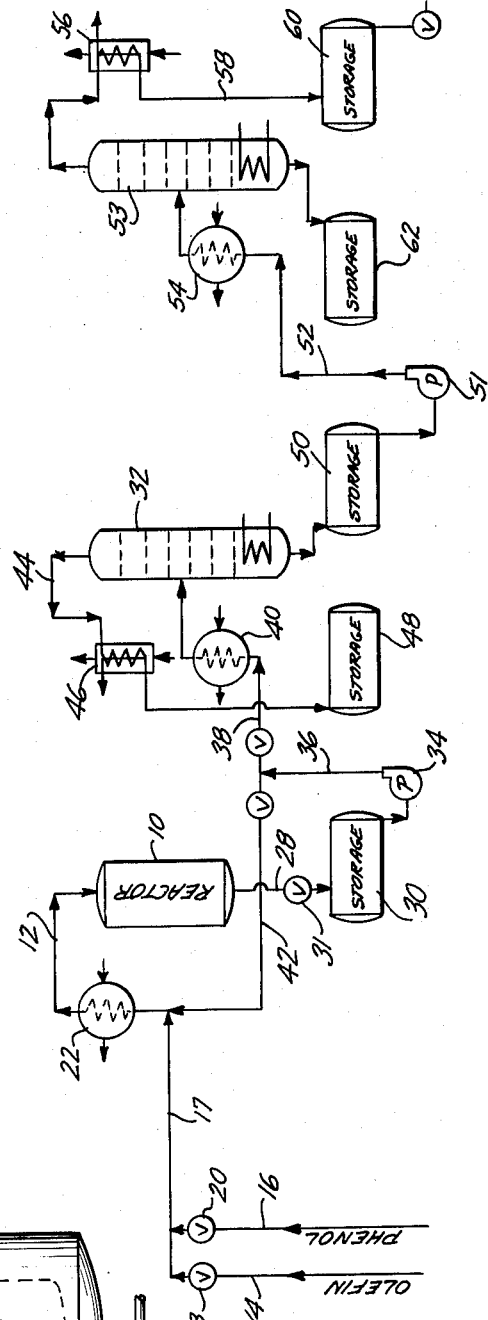
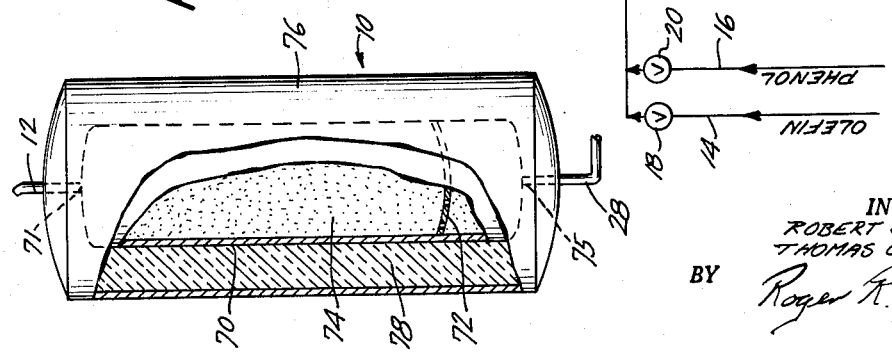
INVENTORS
ROBERT J. O'NEILL
THOMAS C. TESDAHL
BY
ATTORNEY United States Patent Office 3,257,467
Patented June 21, 1966

3,257,467
CONTINUOUS METHODS FOR EFFECTING RING SUBSTITUTION OF PHENOLS
Robert J. O'Neill, Glendale, and Thomas C. Tesdahl, Creve Coeur, Mo., assignors to Monsanto Company, a corporation of Delaware
Filed July 21, 1960, Ser. No. 44,439
7 Claims. (Cl. 260—624)

This invention relates to a continuous process for alkylating phenols with olefin acting compounds, the term "alkylating" being employed in a broad sense to include the introduction of substituted as well as unsubstituted alkyl groups. More particularly, the invention relates to a process for performing an alkylation reaction under controlled conditions such that an improved product is obtained.

Procedures for alkylating phenols with olefin acting materials are well known in the art and are widely employed in the production of detergent intermediates and other products. In the phenol alkylation procedures presently employed a major portion of the alkylation reaction, if not the entire reaction, is normally carried out under substantially isothermal conditions, and the usual procedure comprises heating together a mixture of phenol, olefin acting material and catalyst in a batch process until the reaction is reasonably complete. Such procedures are usually conducted at relatively high temperatures because such temperatures are required in most batch procedures to effect a reasonably complete utilization of the raw materials, and inasmuch as the reaction rate in such procedures is relatively slow, the reaction mixture is normally at substantially the maximum reaction temperature before any appreciable quantities of the raw materials have reacted. Retaining the reaction mixture at a high temperature for a prolonged period results in large quantities of byproducts being formed and in a relatively impure and highly discolored product.

It has been found in accordance with this invention that the disadvantages of the prior art procedures as above described can be overcome by utilizing a process in which an alkylatable phenol and an olefin acting compound are passed through a bed of particulate catalyst under such conditions that the temperature of the reaction increases as the reaction approaches completion due to the heat of reaction. More particularly, several variables, including the mean temperature at which the phenol and olefin acting compounds are introduced to the catalyst bed, the heat loss from the catalyst bed, and the rate at which the reactants are withdrawn from the catalyst bed, are correlated to obtain a selected temperature gradient and a desired terminal reaction temperature. By this procedure the reaction for the greater part is conducted at relatively low temperatures and only the terminal portions of the reaction are conducted at relatively high temperatures. Since most of the reaction occurs under extremely favorable temperature conditions, by-products production and discoloration of the desired reaction product are held to a near minimum.

The improvement in product quality obtained in accordance with this invention is particulraly noticeable when either the phenol or the olefin acting material comprises a mixture of different materials. This is usually the case with respect to the olefin acting material because the type of olefin acting materials most frequently used in the alkylation of phenols are olefin polymers formed by the polymerization of propylene, butylene or other lower alkylenes. In a mixture of materials of this type, there are invariably compounds which react readily and compounds which react only with greater difficulty and the procedures of alkylation heretofore employed have resulted in the reactive materials being reacted at temperatures which would only be required for the relatively nonreactive components of the mixture. By the procedure of this invention, however, the readily reactive components of the mixture are reacted at low temperatures and only a necessary minimum portion of the reaction is conducted at relatively high temperatures.

In addition to the advantage of product quality, a process according to this invention has the advantage of being continuous in nature. A continuous process is generally considered desirable since it is usually more efficient and lends itself more readily to automatic control. A process according to this invention also has the advantage that a near maximum utilization of the heat of reaction can readily be achieved.

A preferred embodiment of the invention will now be described with reference to the accompanying drawings in which:

FIGURE 1 is a schematic drawing showing principal apparatus components in operative relationship; and FIGURE 2 is an enlarged view, partially in section and with parts broken away, of the reactor used in the apparatus of FIGURE 1.

With reference to the drawings in greater detail, the numeral 10 indicates a reactor of a type to be subsequently described in detail. The reactor 10 is connected at its upper extremity with a conduit 12, through which flows a mixture comprising an olefin acting compound, supplied by means of a conduit 14 and an alkylatable phenol supplied by means of a conduit 16. The conduits 14 and 16 discharge into a mixing conduit 17 and are provided with valves 18 and 20, respectively, so that the ratio of phenol to olefin in the reaction mixture can be readily controlled. Disposed between conduits 17 and 12 is a heat exchanger 22 which can be conventional in design and which is for the purpose of placing the mixture of phenol and olefin at a suitable temperature as it enters reactor 10.

Within the reactor 10 the phenol and olefin, operatively introduced through conduit 12, at least partially react and the crude product is withdrawn through a conduit 28 to a suitable storage vessel indicated by the reference numeral 30. The conduit 28 may suitably contain a valve 31 to regulate the rate of flow of the crude product from reactor 10, and a heat exchanger, not illustrated, to cool the crude product and to provide a source of heat energy which can be employed, for example, to raise the temperature of the reaction mixture as it flows through heat exchanger 22.

Provision is made for passing the crude product collected in storage vessel 30 to a first distillation column 32 by means of a pump 34 and conduits 36 and 38. A heat exchanger indicated by the reference numeral 40 is disposed in conduit 38 and is for the purpose of heating the crude material to a proper temperature to be fed to the distillation column 32. Alternatively, the crude product can be passed from conduit 36 through a conduit 42 to heat exchanger 22 and again through reactor 10. This is sometimes convenient when the apparatus is first placed in operation and the degree of reaction between the materials first passed through the reactor is not as high as can readily be achieved when all components of the apparatus reach proper operating conditions.

Distillation column 32 is for the purpose of separating unreacted materials and low boiling by-products from the crude product, and these materials in gaseous form operatively pass from the distillation column 32 through a conduit 44 to a condenser 46, and the condensate is collected in a storage vessel 48. The condensate from condenser 46 is, under operating conditions, normally composed largely of phenol because an excess of this reactant can be advantageously employed. This excess phenol may be recovered and reused.

The residue from distillation column 32, which is composed primarily of the desired alkyl phenol product and high boiling impurities, is passed to a storage vessel 50 and thereafter by means of a pump 51 and conduit 52 to a second distillation column 53. The conduit 52 contains a heat exchanger 54, which can be conventional in design and construction and which is for the purpose of placing the feed to distillation column 53 at a proper temperature. The lower boiling fractions of the product fed to distillation column 53 are passed overhead and condensed by means of a conventional condenser 56. The condensate from condenser 56 constitutes the desired alkyl phenol product and is passed by means of a conduit 58 to a suitable storage tank 60. The residue from distillation column 53 is composed primarily of high boiling impurities and is collected in a suitable storage vessel 62.

The reactor 10, which will now be described in greater detail with particular reference to FIGURE 2 of the drawings, comprises a cylindrical container 70 which can be formed of soft steel or other suitable material. The container 70 is provided with an inlet 71 at its upper end which is connected to conduit 12 and through which is fed the reactant mixture. Near its lower extremity the tubular container 70 is provided with a perforated support plate 72 which supports a particulate catalyst operatively present in the upper portion of the reaction chamber and which is indicated by the reference numeral 74. The lower extremity of reaction chamber 70 is provided with an outlet 75 to which conduit 28 is connected and through which is withdrawn the crude reaction product resulting from the action of the catalyst 74 on the feed mixture.

Surrounding tubular container 70 is a support shell 76 which can be formed of soft steel or any other suitable structural material. The support shell 76 is appreciably larger than tubular chamber 70, thus providing an enclosed space which can be filled with a heat insulating material as indicated by the reference numeral 78. Any suitable insulating material, such as rock wool, can be employed for this purpose, but the insulation is preferably such that the heat loss from the reaction chamber is substantially minimized.

In operation, valves 18 and 20 are adjusted to give approximately the desired ratio of olefin to phenol in a reaction mixture and the resulting mixture is passed through conduit 17, heat exchanger 22 and conduit 12 to reactor 10. The flow of heating fluid through heat exchanger 22 is adjusted such that the reaction mixture is at approximately the desired temperature at the time it enters reactor 10, and the rate of flow through the reactor 10 is adjusted to an approximately satisfactory level by valve 31. The crude product obtained from reactor 10 is then distilled by means of columns 32 and 53 to obtain a final product from which the degree of conversion and yield can be calculated. The composition of the reaction mixture, the temperature to which the reaction mixture is heated by heat exchanger 22, and the rate of flow through reactor 10 are then correlated to provide a selected mean temperature gradient across the reactor and a selected terminal reaction temperature at the point where the reaction mixture departs from the reactor 10.

The reaction mixture as it enters the reactor can be at any temperature sufficient to initiate the reaction but insufficient to result in the production of objectionable color or excessive quantities of by-product. For example, the reaction mixture as it enters the reactor can, under the proper conditions, be at room temperature or even lower temperatures but is preferably at a temperature of at least about 40° C. At the other extreme, the reaction mixture as it enters the reactor can be at a temperature of 100° C. or even higher but is preferably as low as is conveniently possible and with most reactants is preferably below about 80° C.

The temperature of the crude product mixture withdrawn from the reactor can also be varied within reasonably wide limits but is preferably as low as is consistent with a reasonably complete degree of reaction. In some instances a terminal reaction temperature of about 60 to 70° C. is all that is required for a reaction that is 70% or more complete and can readily be employed if facilities are available for recovery of unreacted raw materials. In most instances, however, the terminal reaction temperature should be at least about 80° C. since temperatures in this range can readily be employed without excess discoloration of the product or the formation of large quantities of by-products. The terminal reaction temperature should not normally be allowed to exceed about 150° C. and preferably the reaction mixture is retained at all times at temperatures below about 125° C.

The rate of flow of the material through the reactor can be varied within reasonably wide limits as long as other process variables are adjusted compensatively. In particular the rate of flow through the reactor is dependent upon the degree of reaction completeness desired, catalyst activity, temperature gradient, reaction mixture composition and terminal reaction temperature. Normally a rate of reactant flow is selected to provide a degree of reaction completeness of at least 30 to 60% and preferably at least 80% when suitable values are assigned to other process variables.

The temperature differential across the reactor can suitably vary within a relatively wide range, the limits for which are determined by such variables as the terminal temperature and the degree of reaction desired. Generally, the ratio of temperature increase in degrees centigrade to the degree of reaction, preferably specified in terms of decrease in olefin concentration in percent by weight, is from about 0.12 to 1.0 and preferably from about 0.25 to 1.0. Expressed in different terms, the temperature increase should be at least 1° C. for each 8% decrease in the percentage of olefin acting material as the reaction mixture passes through the reactor and is preferably from 1° C. for each 4% to 1° for each 1% decrease in olefin acting material. For example, if the degree of reaction is 80% based upon the weight of olefin acting material and the terminal temperature of the reaction mixture as it departs from the reactor is 120° C., the temperature of the reaction mixture entering the reactor should at least be below about 110° C. and preferably between 100° C. and 40° C.

A particularly preferred form of the present invention is based upon the unexpected discovery that the temperature gradient in the reactor which is developed under conditions which are substantially adiabatic, except for the heat furnished by the introduction of raw materials and the heat lost by the withdrawal of the reaction product, is excellent if values for other process variables are near optimum. Under such conditions at least about 90% of the heat of reaction is utilized in raising the temperature of the reaction mixture and no other heat energy is supplied for this purpose. In a process according to this invention the temperature gradient in the reactor is of importance because, values for other variables being known, it is indicative of the temperature-degree of reaction completeness ratio gradient or, in other words, it is indicative of the rate at which the temperature of the reaction mixture increases with increasing degrees of reaction completeness. The latter is dependent only upon the addition to or loss of heat from the catalyst bed and does not depend upon factors such as reactor shape, rate of reactant flow, and activity of the catalyst. With a selected reactant mixture the temperature-degree of reaction completeness ratio gradient in the reactor is dependent only upon the degree and nature of the reaction obtained, the amount, if any, of heat, in addition to the heat of reaction, added to the reactor, and the amount of heat removed or lost from the reactor. It will be apparent from this that with conditions such as to provide a preselected terminal temperature one can decrease the rate at which the temperature rises with increasing degrees of reaction completeness by using an inert diluent or a large excess of one of the reactants, but there are relatively narrow limits as to the amount of excess reactants or inert material that one can efficiently employ and it is, therefore, indeed advantageous that a highly satisfactory temperature gradient is provided with a most advantageous ratio of reactants under the heat transfer conditions previously described.

Catalysts which can be employed in a process according to this invention include any of the particulate catalysts, insoluble in the reactants or a reaction product, which have been conventionally employed as catalysts in the alkylation of phenols. By far the most satisfactory type of catalyst comprises a sulfonated polymer of a mono-vinyl aryl compound sufficiently cross-linked, preferably with a poly-vinyl aryl compound, to provide satisfactory dimensional stability without excessively limited porosity. The latter class of catalysts is referred to simply as "sulfonated aryl resin catalysts." Examples of suitable mono-vinyl aryl compounds from which such catalysts can be predominantly formed include styrene, vinyl toluenes, vinyl naphthalenes, vinyl ethyl benzenes, alpha-methyl styrene, vinyl chlorobenzenes and vinyl xylenes. Examples of suitable poly-vinyl aryl compounds which can be employed for cross-linking purposes include divinyl benzenes, divinyl toluenes, divinyl naphthalenes, divinyl xylenes, divinyl ethyl benzenes, divinyl chlorobenzenes and divinyl-phenyl vinyl ethers. A degree of cross-linkage is generally required to result in a resin which has a physical form such that it is advantageous for use in this invention and the amount of cross-linking should be sufficient to prevent gel formation in the presence of phenols but insufficient to result in the porosity of the resin being reduced to such an extent that the resin cannot readily be permeated by organic liquids. This means that the mol percent of cross-linking agent employed in the formation of the resin should usually be from about 1% to about 16% and preferably from about 2% to about 8%. The degree of sulfonation necessary for a satisfactory rate of reaction is generally that amount necessary to provide an acidity, with the resin in the free acid state of at least about 1 milliequivalent per gram and preferably at least about 3 milliequivalents per gram. The degree of sulfonation does not normally affect the nature of the reaction which is catalyzed and there is no upper limit as to the degree of sulfonation, as far as usefulness in this invention is concerned, but as a practical matter it is seldom economically advantageous to produce sulfonated aryl resins having an acidity above about 6 milliequivalents per gram. A sulfonated aryl resin catalyst for use in a process according to this invention can be and preferably is activated according to the procedure disclosed in U.S. application Serial No. 21,872 filed April 13, 1960, and now abandoned. Such an activation procedure comprises heating a sulfonated aryl resin catalyst in the presence of a phenol and a material capable of forming an azeotrope with water, as illustrated by toluene and tetrapropylene, under such conditions that water is extracted, the water presumably being formed at least partially as a result of the formation of sulfonic acid-phenol ester groups.

The particle size of the catalyst, while having no effect upon the basic nature of the process, changes the activity of the catalyst and determines the rate at which the reaction mixture can be passed through the catalyst bed. As a general rule, the smaller the particle size of the catalyst material, the higher the activity of the catalyst but the greater the resistance to flow of a fixed bed formed of such catalyst. Without increasing the resistance to flow of a bed of catalyst material to commercially unacceptable levels, one can employ a catalyst material having a particle size down to about 200–400 mesh but the use of a catalyst having such a small particle size is not usually advantageous. In most instances, best results are obtained with catalysts having a particle size ranging from about 20–50 to about 100–200 mesh. There is no upper limit as to catalyst particle size except as dictated by practicality.

Any alkylatable phenolic type compound which can be alkylated by conventional procedures can be employed in accordance with this invention, and this includes substantially all monocyclic aromatic hydroxy compounds having an unsubstituted ortho or para position. Illustrative examples of suitable phenolic compounds for use in this invention include phenol; the cresols or other lower alkyl phenols having a free para or ortho position, such as the ethyl phenols and the propyl phenols; and less widely employed phenolic compounds such as the xylenols, carvacrol, thymol, pyrocatechol, resorcinol, pyrogallol, phloroglucinol, guaiacol, orcinol and hydroquinone. In view of this discussion, other suitable phenols will be readily apparent to those skilled in the art.

Olefin compounds that can be employed for ring substitution of phenols in accordance with this invention include straight chain olefins such n-amylene and n-nonene, secondary olefins such as secondary-amylene, and tertiary olefins such as t-butylene. The position of the unsaturation is generally immaterial and one can employ alpha olefins as well as olefins in which the unsaturation is remotely disposed with respect to the terminal carbon atoms. The polymers of propylene and butylene having a total number of carbon atoms of from about 8 to 25 are generally well suited for use in the alkylation processes of this invention and one can suitably employ, for example, propylene tetramer, propylene pentamer, and isobutylene trimer materials. Under proper conditions cycloaliphatic olefins, as illustrated by cyclohexene, and aromatic olefins such as styrene can be utilized. One can also employ other types of unsaturated materials as illustrated by aliphatic acids such as oleic acids, diolefins such as butadiene, and halogenated olefins. Under proper conditions there can also be employed materials which are readily transformed into olefins such as secondary and tertiary alcohols, alkyl halides and ethers such as di-tertiary butyl ether. Generally, any olefin acting compound which can be satisfactorily employed in prior art procedures for substituting the aromatic ring of a phenolic compound with an aliphatic side chain can be used in accordance with this invention.

The ratio of phenol to olefin acting material in the reaction mixture can be varied within limits but an excess of phenol is preferably employed since this provides a more workable mixture in terms of viscosity, and provides better over-all yields. Ratios as high as 5 parts phenol to 1 part by weight of olefin can be employed with satisfactory results, but preferably the phenol/olefin ratio is from 1.2:1 to 3.5:1. Other expedients of this type conventionally employed in phenol alkylation reactions can also usually be employed with the processes of this invention.

*Example 1*

Into the reactor of apparatus generally similar to that shown in the drawings there was placed 84 parts by weight (on a dry basis) of a sulfonated styrene resin, cross-linked with about 4% by weight of divinyl benzene, which had been previously dehydrated and activated in accordance with the procedure of U.S. application Serial No. 21,872. The resin catalyst had a particle size of from 20 to 50 mesh and a titratable acidity after an extraction of anhydrous methyl of 2 milliequivalents per gram.

There was then fed to the above catalyst bed at a rate of about 200 parts by weight per hour a substantially anhydrous mixture comprising an olefin-phenol mixture in which the ratio of phenol to olefin was approximately 3 to 1. The olefin was a mixture of propylene polymers boiling within a range of about 185 to 205° C. and was composed largely of propylene tetramer. The phenol was a commercially available material boiling within the range of about 181 to 183° C. The mixture of reactants was at a temperature of 55° C. as it was fed to the reactor, but the temperature of the reaction mixture gradually increased due to the heat of reaction and when equilibrium conditions had been established, the temperature at the point where the mixture departed from the catalyst bed was 105° C.

The crude product passing from the reactor was twice distilled to recover a product fraction having a boiling range of from 208° C. to 240° C. at 50 mm. of mercury absolute pressure. The product was almost water-white in color and was obtained in a yield equal to about 90% of theoretical based upon the weight of olefin material initially employed.

*Example 2*

Example 1 was repeated except that there was substituted for the olefin material employed in Example 1 a stoichiometrically equivalent quantity of propylene polymer (primarily trimer) having a boiling range of 260° F. to 290° F. and except that the reaction mixture was fed to the reactor at a temperature of about 45° C. An almost water clear monoalkyl phenol product having a boiling range of from 187° C. to 228° C. at 70 mm. of mercury absolute pressure was obtained. The yield was in excess of 90% of theoretical based upon the weight of olefin material employed.

The procedure when using other types of phenols, olefins and catalysts can be the same as in the above examples with appropriate changes being made in feed temperatures, feed ratios and distillation temperatures.

Having thus described our invention and several specific embodiments thereof, what we desire to claim and secure by Letters Patent is:

1. A method which comprises passing a reaction mixture comprising a monocyclic phenol and an ethylenically unsaturated aliphatic hydrocarbon having not more than about 25 carbon atoms into a thermally insulated bed of a sulfonated aryl resin alkylation catalyst, withdrawing from said catalyst bed a mixture comprising the reaction product of said phenol and said ethylenically unsaturated compound, and correlating the initial composition of said reaction mixture, the temperature at which said reaction mixture is introduced to said catalyst bed, the heat transferred to and from said thermally insulated catalyst bed, and the rate at which said reaction mixture is withdrawn from said catalyst bed to obtain a mean temperature gradient such that the rate of temperature increase across the catalyst bed is equal to 1 degree centigrade for each 1 to 8% decrease in olefin concentration, based on the weight of olefin initially present in the reaction mixture, as the reaction mixture passes through the catalyst bed, and the terminal reaction temperature at the point where said reaction product is withdrawn from said bed is from about 80 to 150° C.

2. A method in accordance with claim 1 wherein said catalyst bed is unheated except by said reaction mixture and the heat of reaction.

3. A method in accordance with claim 2 wherein said catalyst bed is operatively maintained under conditions which are substantially adiabatic except for the heat furnished by the introduction of raw materials and the heat lost by the withdrawal of the reaction product.

4. A method in accordance with claim 1 wherein said particulate catalyst comprises a sulfonated aryl resin.

5. A method in accordance with claim 4 wherein said resin is a sulfonated styrene-divinyl benzene copolymer sufficiently cross-linked to prevent gel formation in the presence of phenols but not so highly cross-linked that its porosity is reduced to an extent that it is not readily permeated by organic liquids.

6. The method of claim 5 wherein said phenol is phenol.

7. A method according to claim 5 wherein said olefin is a propylene polymer.

References Cited by the Examiner

UNITED STATES PATENTS

| | | | |
|---|---|---|---|
| 2,039,344 | 5/1936 | Putnam et al. | 260—624 |
| 2,141,443 | 12/1938 | Stanley et al. | 260—615 |
| 2,419,599 | 4/1947 | Schulze | 260—624 |
| 2,671,117 | 3/1954 | Kluge et al. | 260—624 |
| 2,802,884 | 8/1957 | D'Alelio | 260—624 |

LEON ZITVER, *Primary Examiner.*

CHARLES B. PARKER, *Examiner.*

H. G. MOORE, D. R. MAHANAND, J. E. EVANS,
*Assistant Examiners.*